United States Patent [19]

Cody et al.

[11] Patent Number: 4,521,051
[45] Date of Patent: Jun. 4, 1985

[54] VISOR WITH MIRROR AND STORAGE MEANS

[75] Inventors: Michael J. Cody; Scott A. Spykerman, both of Holland, Mich.

[73] Assignee: Prince Corporation, Holland, Mich.

[21] Appl. No.: 532,395

[22] Filed: Sep. 15, 1983

[51] Int. Cl.³ ............................................. B60J 3/02
[52] U.S. Cl. .............................. 296/97 H; 296/37.8; 224/312
[58] Field of Search ............... 296/37.8, 97 H, 97 R; 224/312; 49/177

[56] References Cited

U.S. PATENT DOCUMENTS

| | | | |
|---|---|---|---|
| 1,990,413 | 2/1935 | Michaelis | 296/97 G |
| 2,148,557 | 2/1939 | Hook | 224/311 |
| 2,547,101 | 4/1951 | Uttz | 224/312 |
| 2,628,008 | 2/1953 | Innis | 224/312 |
| 2,673,670 | 3/1954 | Steele | 224/312 |
| 3,016,262 | 1/1962 | Hunt | 224/312 |
| 4,275,916 | 6/1981 | Skogler | 296/97 H |
| 4,275,917 | 6/1981 | Marcus | 296/97 R |
| 4,378,129 | 3/1983 | Kaiser | 296/974 |

FOREIGN PATENT DOCUMENTS

| | | |
|---|---|---|
| 2429685 | 1/1980 | France . |
| 474381 | 8/1969 | Switzerland . |
| 1099694 | 1/1968 | United Kingdom . |

Primary Examiner—Robert R. Song
Attorney, Agent, or Firm—Price, Heneveld, Huizenga & Cooper

[57] ABSTRACT

A visor body with a relatively large central recess which opens toward one side of the visor body. A mirror panel with a mirror encloses a substantial portion of the recess and defines an opening on one edge of the recess to provide access to the storage compartment formed between the panel and the floor of the recess. In one embodiment of the invention the panel is pivotally and slidably mounted to a guide within the recess such that it can be reversed to selectively expose the mirror for use or conceal the mirror for safety.

15 Claims, 10 Drawing Figures

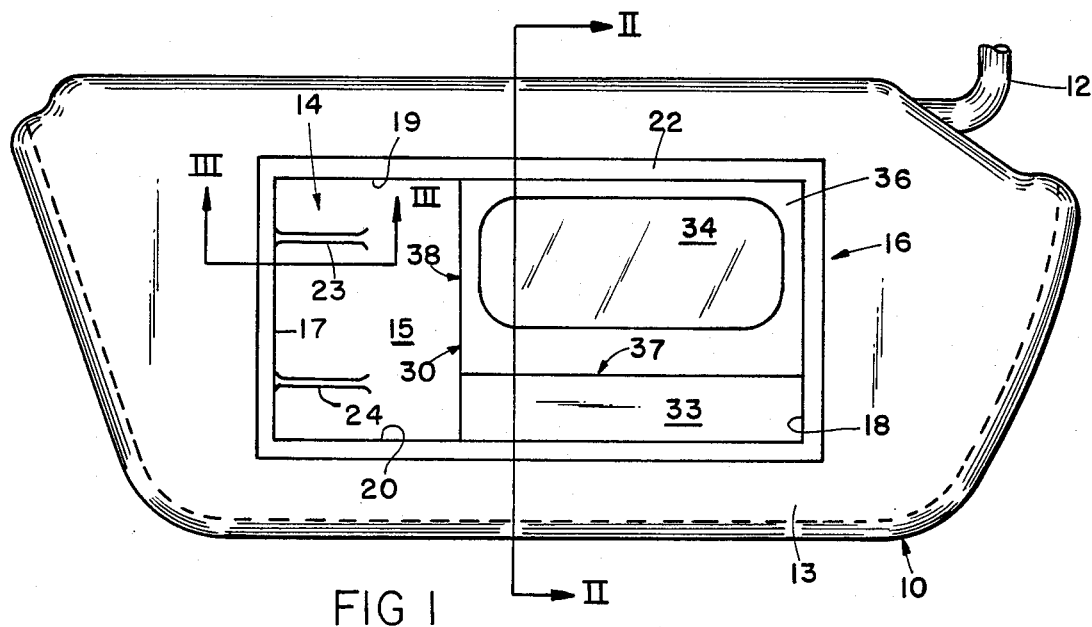
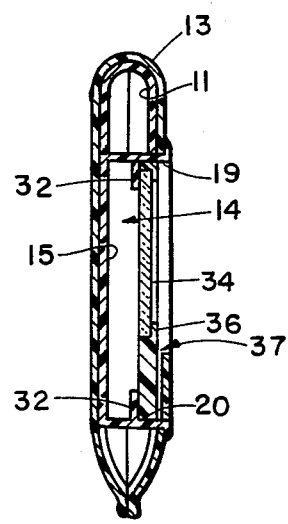
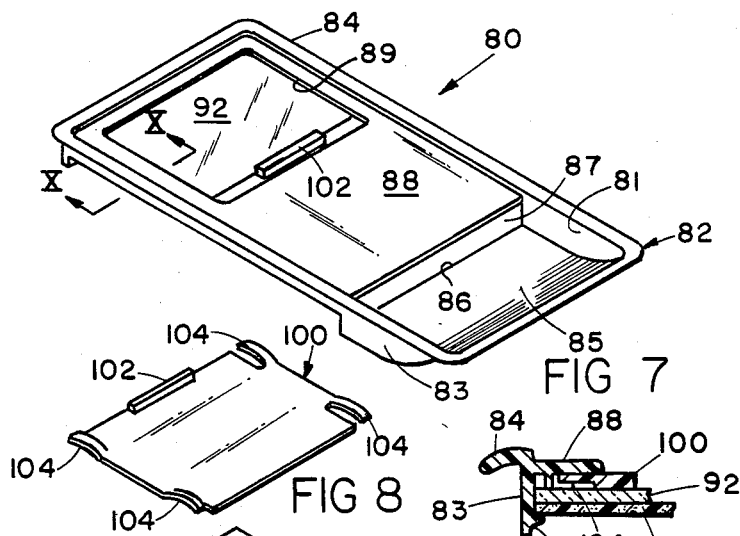
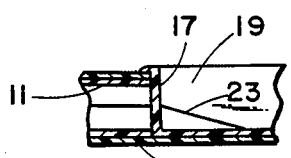
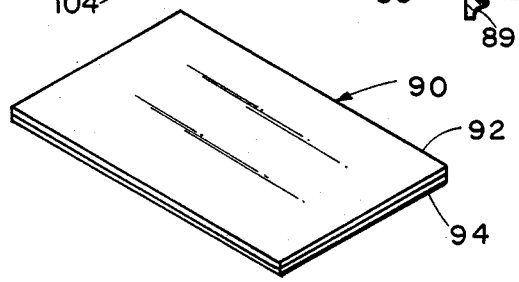

VISOR WITH MIRROR AND STORAGE MEANS

BACKGROUND OF THE INVENTION

The present invention relates to automotive visors and particularly to a visor incorporating storage means therein.

There exists a variety of visors with attachments for storage of personal articles such as combs, make-up and the like. Such devices can be part of the visor itself or an attachment. U.S. Pat. Nos. 1,990,413; 2,148,557; 2,547,101; 4,275,916; and 4,275,917 are representative of such existing structure. Switzerland Pat. No. 474,381 shows a zippered storage compartment for a visor while Great Britain Pat. No. 1,099,694 illustrates a visor including pockets for storage.

SUMMARY OF THE PRESENT INVENTION

The apparatus of the present invention represents an improvement over the existing structure by providing a visor body having a relatively large central recess formed therein which opens toward one side of the visor body. A mirror panel for supporting a mirror is coupled to and encloses a substantial portion of the recess and defines an opening on one edge of the recess to provide access to the storage compartment formed between the panel and the floor of the recess. A mirror is positioned on the panel and faces outwardly for use as a vanity mirror. In one embodiment of the invention, the panel is pivotally and slidably mounted to guide means within the recess such that it can be reversed to selectively expose the mirror for use or conceal the mirror for safety. The side opposite the mirror may, in some embodiments, include a pocket for receiving objects for storage in addition to the storage area behind the panel and within the recess.

In other embodiments of the invention, cover means are provided for selectively covering the mirror when in a position facing outwardly of the visor.

These and other features, objects and advantages of the present invention will become apparent upon reading the following description thereof together with reference to the accompanying drawings in which:

BRIEF DESCRIPTION OF THE DRAWINGS

FIG. 1 is a front elevational view of a visor embodying the present invention;

FIG. 2 is a cross-sectional view of the structure of FIG. 1 taken along section line II—II of FIG. 1;

FIG. 3 is a cross-sectional view of a portion of the structure shown in FIG. 1 taken along section line III—III of FIG. 1;

FIG. 7 is a perspective view of an alternative embodiment of the invention;

FIG. 8 is a perspective view of a portion of the structure shown in FIG. 7;

FIG. 9 is a perspective view of the mirror structure shown in FIG. 7; and

FIG. 10 is an enlarged, fragmentary, cross-sectional view taken along section line X—X of FIG. 7.

DETAILED DESCRIPTION OF THE PREFERRED EMBODIMENT

Figure 4:
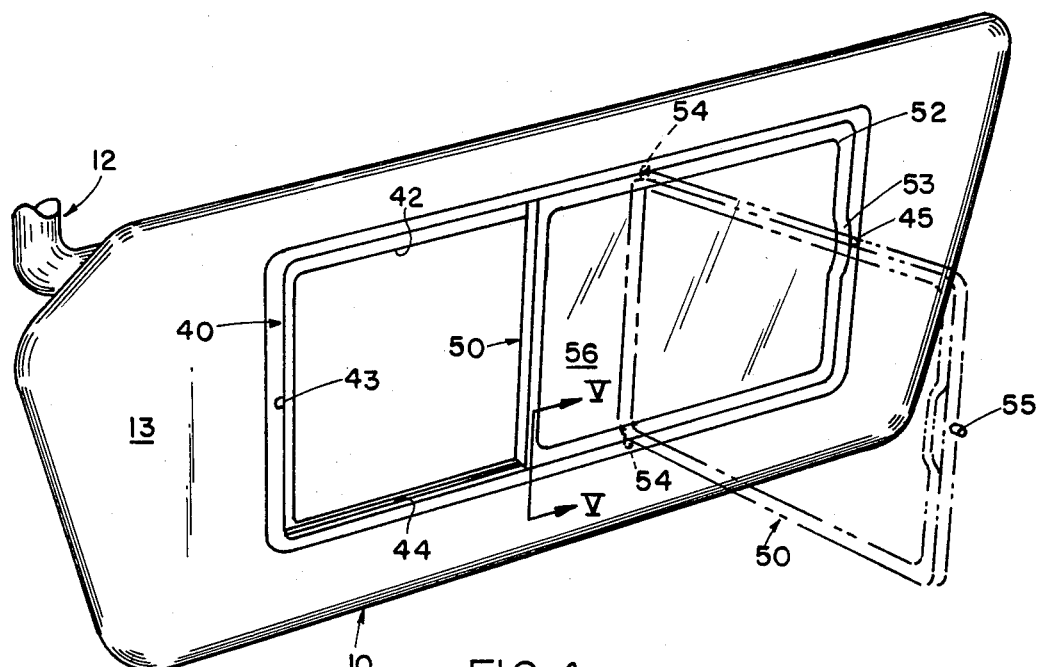
FIG. 4 is a perspective, partly phantom, view of a visor embodying an alternative embodiment of the present invention.

Referring initially to FIG. 1, there is shown an automotive visor 10 having a molded polymeric core 11 (FIG. 2) and supporting along its top edge, a visor pivot rod assembly 12 which can be of the construction disclosed in U.S. Pat. No. 4,352,518. The visor core is covered with an upholstery material 13 to conform to the vehicle's interior upholstery. One side of the visor core includes a generally rectangular and relatively large recess 14 formed therein which, as seen in FIG. 1, occupies a substantial portion of the visor body. A storage member 16 integrally molded of a polymeric material such as polycarbonate is inserted into the recess 14 and conventionally secured to the visor body. Member 16 integrally includes a floor 15 recessed from the outer surface of the visor, sidewalls 17 and 18, a top wall 19 and a bottom wall 20. A peripheral flange 22 is integrally joined to the outer edges of the walls and provides a trim appearance by overlying the upholstery material 13 at the junction of the sidewalls and upper and lower walls. A pair of inclined ramps 23 and 24 extend between wall 17 and floor 15 with ramp 23 being shown in FIG. 3. The ramps are inclined at an angle at approximately 30 degrees and facilitate removal of planar objects such as maps from the storage area.

A mirror panel assembly 30 is secured to frame assembly 16 and defines one wall of the storage compartment between assembly 30 and floor 15. In the preferred embodiment, as best seen in FIG. 2, the panel is supported by flange means 32 extending from upper and lower walls 19 and 20 with panel 30 being secured thereto by a suitable bonding adhesive. Panel 30 may also be covered with a suitable upholstery fabric 33 of the same type as fabric 13. In the embodiment illustrated in FIG. 1, panel 30 includes a mirror 34 secured behind a face panel 36 to provide a vanity mirror for use in connection with the visor. The generally rectangular mirror 34 occupies approximately ⅔ of the upper portion of the panel assembly 30 below which there is formed a fabric pocket 37 for receiving personal care items such as a comb.

The left edge of assembly 30 defines an opening 38 for receiving generally planar objects such as roadmaps which can be slipped behind panel assembly 30 for storage within the recess 14 of the visor. Ramps 23 and 24 assist in urging and holding the edge of a map slightly raised from floor 15 to facilitate grasping and removal of such objects from the storage recepticle so defined. In the embodiment of the invention illustrated in FIGS. 1 through 3, the mirror panel assembly 30 is fixedly mounted to the visor recess frame while in the embodiment illustrated in FIGS. 4 through 6 the mirror panel assembly is pivotally and slidably mounted to permit reversal. The alternative embodiment illustrated in FIGS. 4 through 6 is now described.

In the alternative embodiment, the visor 10 can be of the same construction as the first embodiment with similar part numbers identified by identical reference numbers. The visor body illustrated in FIG. 4 also includes a generally rectangular recess 14 formed therein for receiving a frame 40 having substantially the same construction as frame assembly 22 with the exception that the upper and lower sidewalls 19 and 20 include elongated guide tracks 42 and 44 formed therein, as best seen in FIG. 5. A mirror panel 50 includes a rectangular frame 52 with guide pins 54 and 56 extending outwardly from opposite corners thereon and fitting within guide tracks 42 and 44, respectively, permitting frame 52 to slide along and within frame 40 as well as pivot, as illustrated in phantom lines in FIG. 4. A mirror 57 is positioned on one side of frame 52 for use as a vanity mirror. The right edge of frame 52, as illustrated in FIG. 4, includes handle means 53 facilitating movement of the frame within guide tracks 42 and 44 as well as a spring-loaded snap lock 55 which fits within a detent 43 or 45 formed in the vertical sidewalls of frame 40 to hold the mirror panel 50 in a position flush with respect to frame 40 and the visor body.

Figure 5:
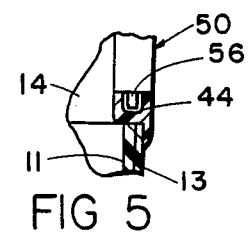
FIG. 5 is a cross-sectional view of a portion of the structure shown in FIG. 4 taken along section line V—V of FIG. 4.
Figure 6:
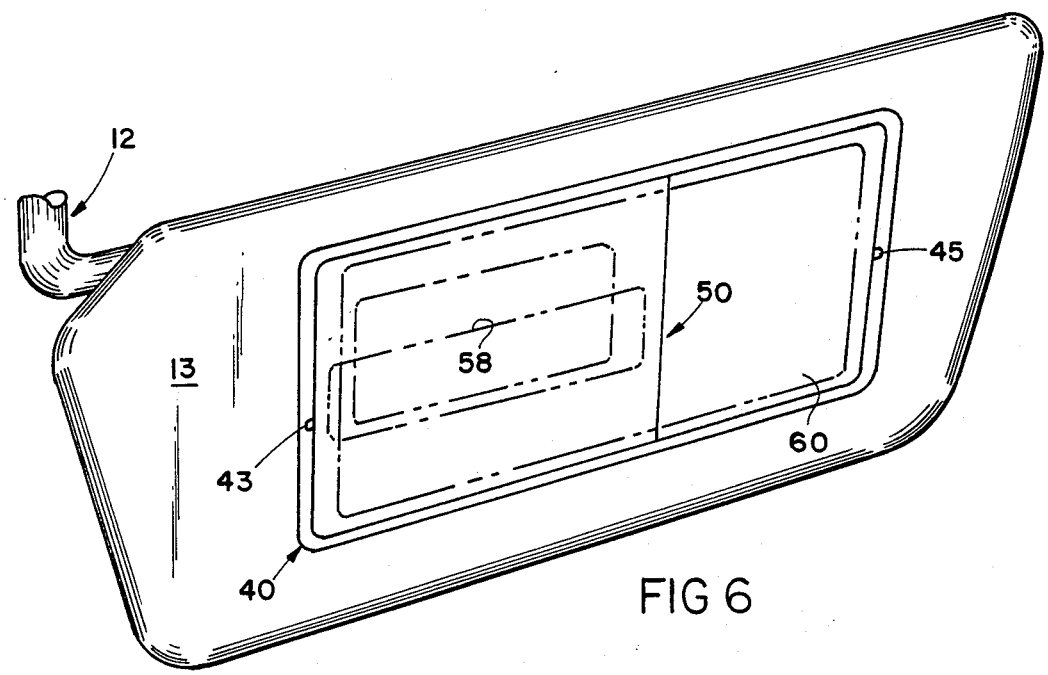
FIG. 6 is a perspective view of the visor shown in FIG. 4 with the movable panel shown in a reversed position.

As illustrated in FIG. 4, panel 50 can be opened and pivoted about a vertical axis generally parallel to the plane of visor 10 such that the panel 50 can be reversed, as illustrated in FIG. 6, with the opposite side of panel 50 including a pocket 58 formed therein for receiving items such as parking coupons, combs, or the like. Pocket 58 is formed by an overlying panel of upholstery material in the same manner as pocket 37, shown in FIG. 1. With the construction shown in FIGS. 4 through 6, a larger mirror 57 can be provided as well as a larger storage pocket on a reverse side of the mirror panel. Also, by providing a panel which opens and can be reversed, access to the storage area behind the panel for items such as maps 60, illustrated in FIGS. 4 and 6, is facilitated.

Referring now to FIG. 7, an alternative embodiment of the structure shown in FIG. 1 is illustrated in which the frame assembly 20 and panel assembly 30 is replaced with an integrated covered mirror and storage pocket assembly 80. Assembly 80 comprises a frame 82 which is generally rectangular and includes a peripheral flange 84 extending therearound and fits within a recess such as recess 14 formed in the body of a visor 10, such as shown in FIG. 1. The frame 82 includes a curlinear wall 85 at one end which extends between sidewalls 81 and 83 and terminates at its right edge against flange 84 and defines at its left edge 86 an opening 87 for insertion of objects such as roadmaps or the like behind panel member 88 and within the recessed body of the visor. Integrally molded within the rectangular flange 84 is a face panel 88 having an opening 89 which selectively exposes a mirror comprising a two piece structure including a mirror panel 92 and an integrally formed backing material 94, as illustrated in FIG. 9. A generally rectangular, planar cover 100 selectively closes the rectangular opening 89 and is seen in FIG. 8 and includes a raised handle 102 extending along one edge and is centrally located for convenience in opening and closing the cover 100. At each of the four corners of the cover 100, there is integrally formed curved leaves 104 to bias the cover between panel 88 and the surface of mirror 92 to provide a smoothly moving cover which is rattle free.

Frame 82 is integrally molded of a suitable polymeric material such as polycarbonate as is cover 100. Assembly 80 is manufactured by first inserting cover 100 in position from the rear side of frame 82 positioning the mirror assembly 90 over the cover assembly and heat staking the lower edges of the walls 81 and 83, as illustrated at 89 in FIG. 10, to complete the assembly of the frame insert package 82. The package is then installed in the recess 14 provided in the visor body 12 by suitable fastening means such as screws or bonding adhesive in a conventional manner.

It will become apparent to those skilled in the art that various modifications to the preferred embodiments described herein can be made without departing from the spirit or scope of the invention as defined by the appended claims.

The embodiments of the invention in which an exclusive property or privilege is claimed are defined as follows:

1. A vehicle visor and storage compartment comprising:
    a visor body having a central recess formed therein which opens toward one side of said body;
    a mirror panel for supporting a mirror thereon said panel coupled to said body to enclose a substantial portion of said recess and define an opening to said recess from an edge of said panel for insertion and storage of objects within said recess and behind said panel; and
    a mirror secured to said panel.

2. The apparatus as defined in claim 1 wherein said recess includes guide means extending along upper and lower edges thereof and wherein said panel includes means engaging said guide means for permitting said panel to be reversed with said mirror facing said visor body.

3. The apparatus as defined in claim 2 wherein said guide means comprises elongated slots and wherein said engaging means comprises pins extending from opposite edges of said panel into said slots permitting said panel to pivot on an axis parallel to the plane of said visor body and permitting said panel to slide along said guide means for reversing said panel.

4. The apparatus as defined in claim 3 and further including latch means for releasably securing said panel in a fixed position.

5. The apparatus as defined in claim 4 wherein said panel includes pocket means for storage on a side opposite said panel from said mirror.

6. The apparatus as defined in claim 5 wherein said mirror covers only a portion of said panel and said panel includes pocket means for storage positioned adjacent said mirror on said panel.

7. The apparatus as defined in claim 6 wherein said recess includes a floor extending substantially parallel to said panel and wherein said floor includes inclined ramp means located opposite said opening for facilitating insertion and removal of planar objects into said recess behind said panel.

8. The apparatus as defined in claim 1 and further including door means mounted to said panel for selectively covering said mirror.

9. In a vehicle visor and storage compartment including a visor body having a recess formed in one side thereof, the improvement comprising:
    a panel assembly shaped to fit in said recess, said assembly including a front panel portion having a mirror opening therein, said panel assembly defining a storage recess behind said front panel portion and an access opening for access to said storage recess;
    a mirror secured to said panel assembly behind said mirror opening; and
    cover means slidably mounted to said panel assembly for selectively covering said mirror.

10. The apparatus as defined in claim 9 wherein said cover is positioned between said panel and said mirror and integrally includes leaf spring means for holding said cover in a selected position.

11. The apparatus as defined in claim 10 wherein said cover is rectangular and said spring means are curved legs integrally formed at the corners of said cover.

12. A vehicle visor and mirror assembly comprising:
a visor body having a recess formed therein including spaced facing edges for receiving a flip-over mirror; and
a panel including a mirror on one side and covered on an opposite side, said panel including pivot pins coupled to and extending from opposite sides of said panel for engaging said edges of said recess such that said panel can be pivoted about an axis spaced inwardly from the edges of said visor body to flip-over for exposing either said mirror or said covered side of said panel.

13. The apparatus as defined in claim 12 and further including latch means for releasably securing said panel in a fixed position.

14. The apparatus as defined in claim 13 wherein said mirror panel includes pocket means on said covered side for storage.

15. The apparatus as defined in claim 12 wherein said recess in said visor body includes a floor which is spaced from said panel to define a storage recess behind said panel.

* * * * *